Patented Jan. 24, 1939

2,145,193

UNITED STATES PATENT OFFICE 2,145,193

VAT DYE COMPOSITION

Jean G. Kern, Hamburg, N. Y., assignor to National Aniline & Chemical Company, Inc., New York, N. Y., a corporation of New York No Drawing. Application May 26, 1933, Serial No. 673,031

18 Claims. (Cl. 8—34)

This invention relates to the art of dyeing and coloring, and to compositions of matter useful in connection therewith and processes for their manufacture. It relates especially to compositions of matter containing a coloring agent (a dye, a pigment, or an intermediate therefor), and/or a substance employed in conjunction therewith, in the form of powders which, when added to water, will readily produce a dispersion (solution or suspension) of said materials, whereby they may be employed in connection with the coloring or dyeing of materials and related processes. The invention also includes processes and compositions for making said products.

The art of dyeing and coloring substances employs a diversity of materials, many of which are utilized in the form of solutions or suspensions in water. A number of said materials are relatively insoluble in water and have the disadvantage that, in the dry or powdered form, they are not readily wetted by water and/or do not readily form suspensions in which the material is sufficiently finely divided to be useful for many purposes. It has therefore been the practice to place such substances on the market in the form of aqueous suspensions or pastes. Such aqueous suspensions have a number of disadvantages, however, from the standpoint of economy. Thus, care must be exercised in their transportation to avoid loss of material by leakage; precautions must be taken in winter to prevent freezing; the water in the paste, which has no dyeing or coloring action, occupies considerable bulk and adds to the weight of the material, thereby adding to the cost of transportation and handling; and care must be exercised in the storage of the paste to avoid drying out and formation of an insoluble crust which does not redisperse and which renders the paste non-uniform and specky. Furthermore, many of the water soluble substances in the dry or powdered form, as for example certain dyes, do not disperse readily when added to water or other compositions in which they are to be employed, presumably because they do not wet and/or tend to go into solution readily.

Various attempts have heretofore been made to provide such composition of matter, and especially dyes and intermediates therefor or substances used in connection therewith, in the form of dry powders which will wet and disperse readily so as to produce rapidly and efficiently pastes or solutions suitable for the various processes of dyeing, coloring and the like. For example, vat dye powders have been produced by drying pastes of vat dyes. In some cases dispersing agents have been incorporated into the vat dye pastes prior to the drying. While the resulting powders frequently have improved wetting and dispersing qualities as compared with ordinary powders produced by grinding dry vat dyes, when converted into a paste by slurrying with water they do not produce a dispersion of the vat dye possessing the suitability for dyeing by all process comparable with that possessed by ordinary commercial vat dye pastes. The principal difficulty with such powders appears to be the failure of the vat dye upon being added to water to revert to its original degree of fineness and uniformity of dispersion, which failure is apparently brought about, in part at least, by changes in the physical condition of the vat dye during the drying.

The present invention is based upon the discovery that the soluble salts of the herein described acid alkyl esters of polybasic acids and their derivatives possess a combination of properties which render them of especial value for the production and manufacture of dye, coloring, and related compositions in the form of solutions, suspensions, pastes and powders, especially powders. Thus, the soluble salts of the herein described acid alkyl esters of inorganic polybasic acids, and especially of sulfuric acid, have the faculty of rapidly entering into solution in water and other aqueous suspension media usually employed in the art of dyeing and coloring. Many of the soluble salts of acid alkyl esters of inorganic polybasic acids, and especially of sulfuric acid, which contain less than 6 carbon atoms in the alkyl group have the property of assisting in the dyeing of textile fibers and fabrics with vat dyes, particularly in conjunction with the methods of application known as the printing process and the pigment padding (pad and jig) process.

The invention accordingly comprises the compositions having the properties, ingredients and proportions of ingredients exemplified in the compositions hereinafter disclosed, and the processes comprising the steps and their relation exemplified in the processes hereinafter disclosed. The scope of the invention will be indicated in the appended patent claims.

The invention will be further described in connection with the preparation of vat dyes in the form of powders. It is to be understood, however, that the invention is not limited thereto but may be employed for the production of vat dyes in the form of pastes, as well as for the production of compositions in the paste or dry form, and particularly in the powdered form, containing other dyeing and coloring substances, intermediates for the production thereof, and substances employed in conjunction therewith, as will appear hereinafter.

As is well known, vat dyes are solid substances which are insoluble in water. In order to render them useful in the dyeing of textile fibers, they are ordinarily converted to a water soluble form (as for example, by treatment with a reducing agent, such as sodium hydrosulfite and alkali), in which form they are absorbed or adsorbed by the fiber, and they are then rendered insoluble by a fixing treatment.

Two general methods are ordinarily employed in practice for dyeing fibers with vat dyes. In accordance with one method, a solution or dye bath containing the vat dye in the reduced form (a so-called vat) is first prepared, the material to be dyed is worked in this solution or bath whereby the fiber takes up the reduced compound of the dye, and the material is then subjected to oxidation and other finishing treatments to convert the vat dye from the reduced to the unreduced form and further complete the fixing of the dye and finishing of the material. In accordance with the other method, the dye is applied to the material to be dyed while in the unreduced form, it is then subjected to a reducing treatment whereby the dye is converted to the soluble form in the presence of the fiber and is taken up by the fiber, and it is then subjected to oxidation and/or other finishing treatments to fix the dye on the fiber, remove undesired residual material, and complete the finishing of the material.

In dyeing with vat dyes by the latter method, one of two procedures is usually followed, it depending upon whether the material is to be dyed a uniform or so-called "solid" color, or is to be dyed in accordance with a pattern or design in one or more colors. If the material is to be dyed a solid color, the so-called "pigment padding" or "pad and jig" process is ordinarily employed. If the material is to be dyed in accordance with a pattern or design, the so-called "printing" process is generally utilized.

The pigment padding process of dyeing with vat dyes generally involves passing the textile material to be dyed through an aqueous suspension or so-called "padding" bath containing the unreduced vat dye in finely divided form suspended in a suitable suspension medium (such as water, which may or may not also contain a gum or thickener and/or other substances such as an assistant, sodium sulfide, mono-, di- or tri-sodium or potassium phosphate, a sodium silicate, a caustic alkali, an alkali metal carbonate, etc.) whereby the fiber mechanically picks up the particles of insoluble dye; subsequently working the textile material, having the particles of dye mechanically attached thereto, in a reducing bath ("jigging") whereby the dye is reduced to the soluble form and is taken up (absorber and/or adsorbed) by the fiber; and finally subjecting the material to oxidation and finishing treatments to reconvert the dye to the insoluble form, fix it on the fiber, and further complete the finishing of the material.

The printing process of dyeing textile fabrics generally involves applying a so-called "printing" paste to the fabric in the form of a design (for example, by means of a screen, a stencil or an engraved roll), and then subjecting the printed fabric to further treatment to fix the dye. In general, vat dye printing pastes contain, in addition to the unreduced vat dye, substances which in themselves do not reduce the vat dye under the conditions of the printing operation but which in the subsequent operations react with the dye to convert it to the soluble form (such as sodium formaldehyde-sulfoxylate and potassium carbonate), other substances or assistants which promote the reduction of the dye and/or absorption of the reduced compound by the fiber, and suitable gums or thickeners. In some cases, as in printing with difficultly reducible vat dyes, the vat dye in the printing paste is subjected to a preliminary reduction before applying the printing paste to the fabric. The fixing treatment usually comprises subjecting the printed fabric to a short treatment with wet (saturated) steam while excluding air (so-called "steaming" or "ageing") whereby the vat dye is reduced (for example, by the action of the sodium-formaldehyde-sulfoxylate and potassium carbonate), or its reduction is rendered more complete, and the reduced dye is taken up by the fiber, and then subjecting the fabric to oxidizing, washing, and other finishing treatments.

The vat dyes in the solid form are not only insoluble in water but they are not readily wetted by water, and even when ground with water for a considerable length of time, do not disperse uniformly in the extremely finely divided form desired for use in dyeing by the pigment padding and printing processes. They therefore usually come upon the market in the form of aqueous suspensions or so-called "pastes" which generally contain 10 to 20 per cent. of dye, a small amount of a suitable dispersing agent such as "Leukanol" (a condensation product of formaldehyde and a naphthalene sulfonic acid) and the remainder mainly water, a part of which is sometimes replaced by other liquids, such as amino alcohols, polyhydroxy alkylethers or other polyhydroxy alkyl compounds, and cyclic ethers; as for example, glycol ethers, glycol, glycerin, polyglycerines, polyglycols, etc. These suspensions are ordinarily produced by stirring the dispersing and other agent with a filter cake of the dye resulting from filtration of a precipitate of the dye, as obtained for example in its manufacture, or by precipitation in the finely divided form from a vat, or sulfuric acid or other solution.

As has been pointed out above, aqueous pastes have a number of disadvantages, and attempts have been made to provide a vat dye composition in powdered form suitable for dyeing by all processes, including pigment padding and printing, but without complete success.

While the previously noted objections to the vat dye powders known to the art are of consequence in connection with their use in dyeing with a reduced bath or vat, owing to the greater period of time required for complete solution of the vat dye in the course of preparation of the bath and its resulting increased cost of dyeing, they do not prevent the use of such powders in certain connections such as dyeing by the reduced bath or vat process. In connection with the dyeing of textile material by the pigment padding and printing processes, however, the said objections are ordinarily of so great importance as to render such powders of little value for use in the latter processes. This is due to the fact that, in both the pigment padding and printing processes, the insoluble vat dye is converted to the soluble form in contact with the fiber to be dyed, and consequently uniformity of dispersion of the dye in the padding liquor or printing paste is required to avoid unevenness of shade and/or streaking, extremely fine subdivision of the insoluble dye is necessary for level dyeing and sharpness of outline as well as rapidity of reduction in the steaming or ageing step of the printing process, and specks or large particles of insoluble dye must be absent to prevent the formation of specked or spotted dyeings and prints.

In the preparation of a dry vat dye composition in accordance with the present invention, a dispersion or suspension is formed containing the vat dye in a well dispersed form and preferably containing a dispersing agent; a readily soluble salt of an acid alkyl ester of an inorganic polybasic acid more fully identified hereinafter is dissolved in the resulting dispersion, with or without the addition of fillers, and/or other substances desired in the final product; and water is removed from the resulting mixture, preferably with agitation. There are thus obtained vat dye compositions in which the water has been displaced in whole or in part by the alkyl ester salt.

I have found, by removing water, as by evaporation to substantial dryness, from an aqueous dispersion or suspension of a vat dye containing one or more of the soluble salts of acid alkyl esters (partial esters) of polybasic inorganic acids more fully identified hereinafter, and especially those in which the alkyl group is an open-chain hydrocarbon radical containing less than 6 carbon atoms, that the final product has the appearance of a solid dispersed suspension. In those cases where a very large amount of the salt of the acid alkyl ester is employed, a part of said salt may crystallize during the evaporation, but the crystals are generally so finely divided and so evenly distributed throughout the whole composition that the product appears to be substantially homogeneous.

The soluble salts of the acid alkyl esters which may be employed in accordance with the present invention include all soluble salts of partial esters of polybasic inorganic acids, more particularly those of sulfuric, boric, phosphoric and thiophosphoric acids, and especially those of sulfuric and phosphoric acids, containing at least one organic (ester) radical which is an alicyclic radical (cyclo-aliphatic hydrocarbon radical, which may be saturated or unsaturated and which may contain substituents) or is an open-chain hydrocarbon radical (straight-chain, branched-chain, saturated or unsaturated) which contains not more than 5 carbon atoms in the hydrocarbon radical but which may contain one or more inorganic substituents (as for example, a hydroxyl group, an amino group, an imino group, a sulfo group, a sulfate group, a phosphate group, a borate group, etc.) and/or one or more organic substituents of the alicyclic or aromatic series (whether carbocyclic or heterocyclic) and/or one or more lower open-chain aliphatic, alicyclic or aromatic substituents (which may be further substituted by inorganic and/or organic substituents) linked to said open-chain hydrocarbon radical by an inorganic atom (as for example, oxygen, sulfur, nitrogen, etc.). These partial esters (which are herein designated as "acid alkyl esters") may be represented by the formula $(RO)_x$—A—$(ZH)_{n-x}$ in which R represents an alicyclic hydrocarbon radical or an open-chain hydrocarbon radical which contains not more than 5 carbon atoms, which radical may contain a substituent other than an aliphatic hydrocarbon radical, Z represents an oxygen or a sulfur atom, A represents the residue of the inorganic acid (as for example, the radical $SO_2$, the radical PO, the radical PS, B, etc.), $n$ represents the number of hydrogen atoms, in the uncombined polybasic acid from which the ester is derived, which are replaceable by a metal (herein designated as "replaceable hydrogen atoms"), and $x$ is one or more but not greater than $n-1$. As is well known a partial ester (acid alkyl ester) of a polybasic inorganic acid is an ester in which at least one of the replaceable hydrogen atoms of the parent polybasic inorganic acid has not been replaced by an organic radical.

It is to be noted, in the case of acid alkyl esters of polybasic acids containing 3 or more replaceable hydrogen atoms in which more than one of said hydrogen atoms have been replaced by organic radicals, the said organic radicals (represented by R in the above formula) may be the same or different.

Any suitable metal or base, including the organic bases, may be combined with the said acid alkyl esters to form the acid alkyl ester salts employed in accordance with the present invention, provided the resulting salts possess good solubility and also preferably a finely crystalline or amorphous form in the solid state. For example, alkali metal, alkali earth metal, zinc, magnesium, ammonium, etc. salts may be employed. Further, organic bases such as urea, guanidine, certain alkylamines (particularly the hydroxyalkyl amines), pyridine, etc., may be employed to form salts (as for example, quaternary ammonium salts) of said acid alkyl esters.

The alkyl ester salts employed in accordance with the present invention may be prepared in any manner well known to the art; as for example by the treatment of the corresponding monohydric or polyhydric alcohol, hydroxyalkyl ether, hydroxyalkyl amine, etc., in the presence or absence of a solvent or diluent, with a suitable inorganic reagent (such as phosphorus chloride or oxychloride, concentrated sulfuric acid and/or chlorsulfonic acid, etc.), and neutralization of the resulting acid alkyl ester with an inorganic or organic base which forms a readily soluble salt with said acid alkyl ester. It may be noted that the monoalkyl sulfuric acids resulting from the use of sulfuric acid may contain varying amounts of sulfonic acids which are sometimes produced due to secondary reactions; the presence of such sulfonic acids, however, does not impair the usefulness of the monoalkyl sulfuric acids in accordance with the present invention.

As illustrating various types of acid alkyl esters, the soluble salts of which may be employed in accordance with the present invention, the following may be mentioned:

Derivatives of alicyclic alcohols; as for example, the acid alkyl esters which may be derived on the one hand from such acids as sulfuric, boric and phosphoric acids and on the other hand from such alcohols as cyclohexyl alcohol, dihydroxy cyclohexane, ethyl cyclohexyl alcohol, cyclopentyl alcohol, methyl cyclopentyl alcohol, 2-amino cyclohexanol, piperidine beta-carbinol, pyrrolidine alpha-carbinol, etc.

Derivatives of open-chain monohydric aliphatic alcohols which contain not more than 5 carbon atoms and which are free from substituents in the alkyl group; as for example, the monoethyl, propyl, butyl and amyl sulfuric acids, the mono- and di-ethyl, propyl, butyl and amyl phosphoric and boric acids, diamyl dithiophosphoric acid, etc.

Derivatives of open-chain aliphatic polyhydric alcohols which contain not more than 5 carbon atoms; as for example, the mono-glycol and mono-glycerine sulfuric, boric and phosphoric acids, the diglycol and diglycerin monophosphoric acids, the glycol and glycerin disulfuric, diphosphoric and triphosphoric acids, diglycerin boric acid, etc.

Derivatives of alkyl, aralkyl and aryl ethers of open-chain aliphatic polyhydric alcohols in which the alkyl group linked to the inorganic polybasic acid contains not more than 5 carbon atoms, and obtainable for example, by sulfonation or phosphation of said ethers; as for example, alkyl ethers of glycol and glycerin sulfuric and phosphoric acids (such as, the monoethyl ether of glycol sulfuric acid:

the mono-isopropyl ether of glycol sulfuric acid, the monobutyl ether of glycol sulfuric acid, diethylene glycol disulfuric acid:

alkyl ethers of polyglycol and polyglycerin sulfuric, boric and phosphoric acids (such as the mono-methyl, mono-ethyl, etc. ethers of diethylene glycol sulfuric acid:

wherein Alk represents methyl, ethyl, etc. radicals which may contain substituents, as for example, halogen atoms or hydroxyl, sulfo or carboxyl groups, etc.), aryl ethers of glycol and glycerin sulfuric, boric and phosphoric acids (such as, the 2-nitro-4-methyl-phenyl ether of glycol sulfuric acid:

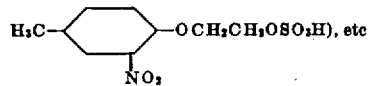

Derivatives of hydroxyalkyl amines of various kinds in which the alkyl group linked to the inorganic polybasic acid contains not more than 5 carbon atoms; for example, amino alkyl sulfuric acids which are included within the formulas:

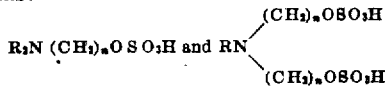

wherein R represents a hydrogen atom or the same or different alkyl groups or substituted alkyl groups or aryl groups or substituted aryl groups, and $n$ is from 2 to 5 (such as, amino ethyl sulfuric acid: $H_2NCH_2CH_2OSO_3H$, N-mono-normal-butyl amino ethyl sulfuric acid:

the acid sulfuric ester of N-di(hydroxyethyl) 2-ethyl-cyclohexylamine, the sulfuric ester of N-mono-hydroxyethyl 2-ethyl-cyclohexylamine, the sulfuric ester of N-mono-hydroxyethyl cyclohexyl-amine, the sulfuric ester of N-di(hydroxyethyl) cyclohexylamine, the sulfuric ester of N-hydroxyethyl tetrahydronaphthylamine, the sulfuric ester of N-hydroxyisopropyl normal-butylamine, the sulfuric ester of the mono-hydroxyethyl ether of N-hydroxyethyl di-normal-butyl-amine:

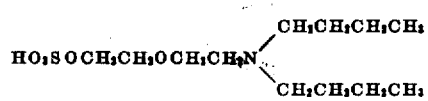

etc.), or their corresponding phosphoric or boric acid derivatives (such as, the acid phosphoric ester of N-hydroxyisopropyl cyclohexyl amine), etc.; which may be obtained, for example, by reacting a strong oxygen-containing polybasic inorganic acid (such as sulfuric acid, phosphoric acid, sulfur trioxide, chlorsulfonic acid, phosphorus oxychloride, etc.) with a saturated or unsaturated, open-chain or cyclic, aliphatic amine, mixed open-chain aliphatic-cycloaliphatic amine, or a mixed open-chain aliphatic-aromatic amine, and particularly one which contains from 2 to 5 carbon atoms in an uninterrupted carbon chain and at least 1 hydroxyl group or olefinic double bond or both, as well as substitution products thereof (such as, hydroxy derivatives of said amines, hydroxy alkyl ethers of said amines, etc.), or by the action of concentrated sulfuric acid upon hydroxy alkyl derivatives of aromatic amines and diamines (such as, N-hydroxyethyl aniline, N-di (hydroxyethyl) aniline, N-hydroxyethyl o-toluidine, N-hydroxyethyl N-benzyl aniline, N-hydroxyethyl alpha- or beta-naphthylamine, N-hydroxyethyl ortho-, meta- or para-diamines, N-hydroxyethyl aminophenols or aminonaphthols—cf. British Patent 181,750), etc.

Mixtures of said salts of said acid alkyl esters may also be employed in accordance with the present invention, as for example the salts of suitable inorganic or organic bases with the commercially available and cheap mixtures of alkyl sulfuric acids resulting from the sulfuric acid treatment of gaseous and lighter liquid unsaturated hydrocarbons, such as the mixtures produced in the recovery and removal of unsaturated hydrocarbons in the production and purification of gasoline in the so-called "cracking" process of petroleum distillation.

In order that the compositions may be in a more satisfactory form for subsequent use, the mixture of vat dye in aqueous dispersion and acid alkyl ester salt, together with the other substances, if added, are preferably evaporated with agitation until a thick paste is formed with or without the aid of vacuum, and preferably at a temperature not exceeding 100° C. The resulting paste may be employed as such, but it is preferably brought to substantial dryness. Thus, the paste may be evaporated to dryness on an atmospheric or vacuum rotary drum drier, preferably at a temperature not exceeding 100° C., and the dry product scraped off in the form of flakes, scales or grains which may be used as such; or the paste, with or without preliminary evaporation, may be admixed with a suitable hydrate-forming soluble salt in an anhydrous condition and the admixture stirred to produce a dry product. If desired, the dry products may be disintegrated into a powder in any suitable manner, as for example by grinding in a ball mill, and subsequently screened.

Inasmuch as the quality and dispersibility of the resulting dye composition is dependent to a considerable extent upon the original degree of dispersion of the dye in the suspension before drying, the vat dye is preferably employed in the highly dispersed form. A suitable dispersing agent is accordingly preferably incorporated into the vat dye suspension so as to aid in preventing precipitation and agglutination of the dye particles during the drying, and to increase the fluidity and render easier the incorporation of the acid alkyl ester salt. Among the dispersing agents which may be employed for this purpose there may be mentioned for example, the sulfonic acids of benzene, hydroxybenzenes, naphthalene, hydroxynaphthalenes, their nuclear alkyl, nuclear aralkyl and hydrogenated derivatives, as well as aldehyde condensation products thereof as for example 2.6-naphthalenedisulfonic acid, 1.7-naphthalenedisulfonic acid, 2.8-naphthalenedisulfonic acid, isopropylnaphthalenesulfonic acids, dibutylnaphthalenesulfonic acids, amylnaphthalenesulfonic acids, butylbenzylnaphthalenesulfonic acids, cyclohexylnaphthalenesulfonic acids, methylene-di (beta-naphthalenesulfonic acid), acetal-di (beta-naphthalenesulfonic acid), benzal-di (beta-naphthalenesulfonic acid), bethylene-di (diisopropylnaphthalenesulfonic acid), etc.; sulfite cellulose waste liquors and their mildly oxidized products and evaporated residues; sulfonated resins; abietine, abietine and abietane sulfonic acids; soaps; sulfonated higher fatty acids, fats and oils; sulfuric acid esters of hydroxy-fatty acid esters of monohydric alcohols; and the like, as well as mixtures of two or more of such substances.

If desired, additional substances having diluent, wetting, catalytic, enolyzing, assisting or other suitable action in the subsequent use of the compositions may also be incorporated into the vat dye compositions of the present invention, preferably while the latter are in the form of aqueous suspensions.

The amount of the salt of the acid alkyl ester employed in the preparation of the vat dye compositions of the present invention may be varied over a considerable range, depending in part upon the concentration of vat dye in the composition, the use to which the composition is to be put, and whether or not other diluents and other materials having a catalytic, assisting, wetting, enolyzing, dispersing, or other action are included in the composition. For example, an ideal vat dye composition in dry form is obtained by replacing all of the water in a vat dye paste with an equal amount of acid alkyl ester salt, in which case the composition of the powder may be for example:

| | Per cent |
|---|---|
| Vat dye (actual dye solids) | 10–20 |
| Dispersing agent (e. g. "Leukanol") | 1–2 |
| Acid alkyl ester salt | 89–78 |

While a powder composition having such a large content of the alkyl ester salt is an extremely advantageous product, in that it is applicable for the preparation of vat dyes of all classes in the powdered form which, when slurried with water, yield pastes that in many cases are even superior to the corresponding vat dye pastes which do not contain the alkyl ester salt, it is frequently unnecessary to employ such large amounts of said salt. For example, when the vat dye powder is to be employed for the preparation of a dye bath (a vat) or when the powder is to be employed for the preparation of a paste useful as a pigment (as for example for the coloring of paper and the like), only a sufficient amount of the acid alkyl ester salt need be employed which will produce the desired dispersion of the powder when added to water. Furthermore, by including diluents and fillers in the composition, a much smaller amount of the alkyl ester salt may be used, inasmuch as the presence of a relatively small quantity of the salt is effective in overcoming the disadvantageous properties of the diluents and fillers previously known and used. As a result, a part of the alkyl ester salt may be replaced in the composition by less expensive diluents and fillers.

As diluents and fillers many known products may be used. For example, the carbohydrates are quite suitable, such as sucrose (ordinary cane or beet sugar), cerelose (or corn sugar), etc. Further, dextrines, glue, gelatin, gum arabic, or other substances included in the general class of so-called "protective colloids" also may be used, as well as other products which do not cause precipitation of suspended vat dye particles or otherwise produce specky printing pastes (as for example, urea, various other highly soluble amides, etc.).

When the vat dye powder compositions of the present invention are to be employed in the preparation of vat dye printing pastes and it is desired to take advantage of the solubilizing action of the acid alkyl ester salts in the preparation of the printing pastes and their assisting action in the printing operation, a larger amount of said salts will ordinarily be employed than would be necessary merely for the preparation of a readily dispersible vat dye powder. As has been pointed out hereinbefore, the specific amount of alkyl ester salt to be employed in any particular composition will vary with the particular dyestuff and with the nature and amounts of other materials present in the composition.

It will be further observed, in the preparation of printing pastes with the aid of vat dye powders of the present invention, that the printing pastes frequently show signs of prereduction, even in the absence of printing catalysts or reduction accelerators employed in the art, such as the sodium salt of anthraquinine-2-sulfonic acid, ferrous salts, and the like.

As above noted, vat dye powders intended for use in dyeing by the printing process may also include, however, printing catalysts or "boosters", reduction accelerators, hydrotropic and/or enolyzing substances, in addition to or in replacement of part of other diluents.

If desired, foam breaking or foam-preventing agents may also be included in the compositions of the present invention, especially in connection with vat dyes which have a tendency to produce foaming.

It is to be noted that under the term "hydrotropic substances" are to be understood not only the substances specifically enumerated by Neuberg and Tamba (compare Carl Neuberg, Biochemische Zeitschrift, vol. 76, 1916, page 107 ff., and Tamba, Biochemische Zeithschrift, vol. 145, 1924, page 415; Carl Neuberg, Sitzungsberichte der Koengl. Preussischen Akademie der Wissenschaften, 1916, page 1034), but all of those substances, which comply with the definition of the word "hydrotropic" as given by Neuberg. As examples of such substances the following may be mentioned: urea, substituted ureas, thio-urea, hexamethylene tetramine, the potassium salt of ethyl sulfonic acid, potasium or sodium isovalerate, the alkali metal salts of the following acids: isobutyric acid, phenylacetic acid, benzoic acid, o-toluene-carboxylic acid, salicylic acid, the benzene sulfonic acids, p-toluene-sulfonic acid, the benzene sulphinic acids, 1.4-toulene sulphinic acid, naphthalene sulfonic acids, aniline sulfonic acids and substitution products thereof, naphthylamine sulfonic acids (as for example, 1-amino-naphthalene-3.6.8-trisulfonic acid), picolinic acid, hydro aromatic carboxylic or sulfonic acids, and the like. It will be further noted that substances which are not, strictly speaking, hydrotropic substances but which possess enolyzing properties are included, as for example, 1-naphthalene sulfonic acid (sodium salt).

The presence of enolyzing substances in vat dye powders prepared in accordance with the present invention is of particular advantage in connection with vat dyes of the indigoid and thioindigoid series, inasmuch as they tend to minimize or prevent isomerization of the reduced vat dye to the keto form.

It may be noted, in connection with the use of the vat dye pastes and powders of the present invention in dyeing and printing, that the vat dye pastes and powders of the present invention may be substituted in ordinary dye baths, padding liquors and printing pastes in place of the usual vat dye pastes (on the basis of the weight of the dye in the paste or powder) without otherwise changing the proportions and ingredients of said compositions.

The vat dye compositions of the present invention are particularly valuable for dyeing and printing so-called "gray goods" (unbleached cellulose fabrics, raw artificial silk fabrics and the like) inasmuch as the dyeings and prints obtained with the aid of such compositions have exceedingly high tinctorial value and excellent penetration, particularly when compared with dyeings and prints made in the absence of the said acid alkyl esters, or their salts, employed in accordance with the present invention.

The invention may be employed in connection with vat dyes of all types including those derived from anthra-quinone, indophenols, various indigoid, thioindigoid and indirubin compounds, etc.; as for example, indanthrones, pyranthrones, flavanthrones, dibenzanthrones, isodibenzanthrones perylene quinones, anthanthrones, dibenzpyrene quinones, anthrimido-carbazols, naphthacridones, indigo, thioindigo, indirubin, etc., including derivatives thereof, such as their halogen, nitro, sulfur and/or alkoxy derivatives.

As has hereinbefore been indicated, the invention is not limited to the utilization of the acid alkyl ester salts in connection with vat dyes but includes their application to the production of compositions in the paste or dry form, and especially in the powdered form, containing other dyeing and coloring substances, intermediates for the production thereof, and substances employed in conjunction therewith. Thus the said alkyl ester salts may be incorporated, for example, into compositions containing the following:

Leuco compounds of vat dyes of the anthraquinone, indigoid, thioindigoid, indophenol and other series (as for example, leuco compounds of the vat dyes hereinbefore specified).

Salts of leuco compounds of vat dyes (as for example, of those before mentioned).

Soluble esters or ester salts of leuco compounds of vat dyes (as for example, the so-called "indigosols" and other soluble esters or ester salts of leuco compounds of the vat dyes before mentioned).

Indulin and nigrosine dyes and their bases.

Mordant dyes, including alizarine and chrome colors.

Dyes for Vigoureux printing.

Insoluble azo dye pigments.

Lakes.

Inorganic pigments.

Direct dyes.

Acid dyes.

Other types of soluble and insoluble dyes and pigments.

Naphthols, arylids of naphthols (as for example, the various arylides of 2.3-hydroxynaphthoic acid), arylids of aceto-acetic acid, and related products employed in the production of dyes in the pigment form or on the fiber or on suitable sub-strata.

Mixtures of naphthols and/or arylids as for example, those before mentioned) with stabilized diazo compounds (as for example, diazo amino compounds, diazo imino compounds, nitrosamines, etc.).

Insoluble substances employed as so-called "boosters" or "catalysts" in dyeing with vat dyes of various types by the printing process, including color discharge and color resist printing, as well as in white discharge printing (as for example, anthraquinone, acenaphthenequinone, naphthoquinone, phenanthrenequinone, and the soluble derivatives thereof, such as their sulfonic acids, etc.).

In preparing a composition containing a leuco compound of a vat dye, in accordance with the present invention, a suitable salt of the leuco compound of the vat dye, as for example, the sodium or potassium salt may be incorporated in the form of a solution or suspension with a soluble salt of the acid alkyl ester and the mixture brought to dryness, ground and screened. The salt of the leuco compound of the vat dye may be obtained in any suitable manner, as for example, by reduction of the corresponding vat dye with sodium hydrosulfite in aqueous solution in the presence of caustic alkali, ammonia, or other suitable base (as for example, an alkylol amine, such as the ethanol amines or the ethanolamino-alkylenes:

$$HOCH_2CH_2NH-C_2H_4-NHCH_2CH_2OH,$$
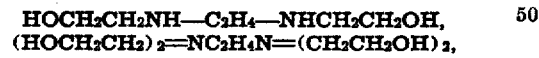

and similar bases which can be obtained by the action of an alkylene oxide on alkylene diamines, etc.), preferably in the absence of air and in the presence of hydrogen or an inert gas (as for example, nitrogen or carbon dioxide). The alkyl ester salt may be directly added to the resulting solution or suspension, or the leuco compound of the vat dye may be isolated and then mixed with a suitable dispersing agent (as for example, one of those hereinbefore mentioned) and then mixed with the alkyl ester salt. The powders obtained by drying and screening the compositions, containing salts of leuco compounds of vat dyes in accordance with the present invention, disperse readily in printing pastes and require only a small amount of sodium formaldehyde sulphoxylate and alkali metal carbonate for their fixation.

Instead of employing the salts of the leuco compounds of vat dyes, the free leuco compounds themselves, which may be obtained, for example, by acidifying the reaction mixtures resulting from reduction of the vat dyes, may be employed.

Soluble esters or ester salts of leuco compounds of vat dyes, as for example, the sulfuric, phosphoric, and the like esters of the leuco compounds of vat dyes and their salts, may similarly be incorporated in the dry form or in the form of a solution or suspension with the acid alkyl ester salts.

In preparing a powder from an indulin base or nigrosine base or corresponding dye, the said compound, as for example, indulin (Color Index No. 860) or its sulfonation product, or nigrosine (Color Index No. 865) or its sulfonation product, may be mixed with the acid alkyl ester salt by grinding in the dry state, or preferably by dissolution in a suitable solvent, as for example, alcohol, followed by drying, grinding and screening. The resulting powders disperse very readily in water and when incorporated into a printing paste yield speck-free prints of high strength on textile fabrics.

Developers for azo dyes, as for example, the arylids of 2.3-hydroxy-naphthoic acid and of aceto-acetic acid (such as the alkali metal salts of the anilid, o-toluidid, the beta-naphthylid, etc., of 2.3-hydroxy-naphthoic acid), may also be converted into readily dispersible and/or readily soluble powders or pastes with the aid of the acid alkyl ester salts. Compositions may also be obtained in accordance with the present invention which comprise admixtures of said developers with suitable stabilized forms of diazo compounds; as for example, so-called nitrosamine salts, or diazo-amino or diazo-imino compounds, such as those which may be reprsented by the following formula:

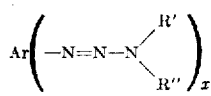

in which

Ar represents a nucleus or residue of the benzene, naphthalene, anthracene or carbazole series which is free from a solubilizing group (such as a carboxyl group, a sulfo group, etc.) but which may contain other substituents;

R' represents an alkyl, cyclo-alkyl, aralkyl or aryl hydrocarbon radical, which may be further substituted, as for example, by one of the groups:

—OH, —SH, —COOH, —SO$_3$H, —OSO$_2$H, —OSO$_3$H, —SO$_2$NH—, —CH$_2$OSO$_2$H, etc.;

R" represents hydrogen or a substituted or unsubstituted hydrocarbon radical of the type represented by R' which may be the same or different; and $x$ represents 1, 2 or 3.

Thus the salt of an arylid of 2.3-hydroxy-naphthoic acid, as for example the sodium salt, may be dissolved in water, alcohol, or any other suitable solvent, with the aid of heat, the acid alkyl ester salt may be dissolved in the resulting solution, and the mixture then may be brought to dryness, ground and screened. A very readily dispersible powder of the arylid salt is thus obtained. Mixtures of the stabilized forms of diazo compounds with the said developers may be prepared by mixing in the dry state the stabilized form of diazo compound (as for example, a so-called nitrosamine salt or a diazo-amino or diazoimino compound with the readily dispersible powder of the developer, as for example the powder herein described, with or without the addition of a suitable diluent or filler and/or other ingredients desired in the final mixed product. Said mixtures are preferably prepared, however, by bringing to dryness a suspension or solution of a mixture of the developer, the stabilized form of diazo compound and the acid alkyl ester salt, with or without the aid of a vacuum drier. For example, the sodium salt of the anilid, or any other arylid, of 2.3-hydroxy-naphthoic acid may be dissolved in ethyl alcohol or other suitable organic solvent, the alkyl ester salt may be added, then a diazo-amino compound or other stabilized form of diazo compound may be added, and the resulting mixture may be evaporated to dryness, ground and screened. The order of adding the developer, stabilized form of diazo compound, and acid alkyl ester salt may be varied.

It is evident from the above disclosure that the invention is not limited to the use of the acid alkyl ester salts in connection with insoluble substances. In view of the action of said alkyl ester salts in accordance with the present invention in producing dry compositions having highly desirable fineness of particle, they are advantageously employed in connection with soluble substances as well as insoluble substances, although they are especially advantageously employed in connection with insoluble substances.

It is further evident from the above disclosure that soluble salts of various acid alkyl esters may be employed in the practice of the present invention. Alkyl ester salts in which the alkyl radical is an open-chain hydrocarbon radical containing from 3 to 5 carbon atoms are preferred, however, and if the product is to be employed in the dyeing of fibers by a printing process, preferably said radical should further be an iso-alkyl radical.

The invention will be further described in connection with the following specific examples (in which the parts are by weight), which are given to illustrate the invention. It will be realized, however, that the invention is not limited thereto but that changes may be made in the materials treated and their proportions, manipulative steps, and other conditions without departing from the scope of the appended patent claims.

*Vat dye powders*

*Example 1.*—400 parts of indigo paste (containing 20 per cent of pure indigo as shown by indigotine titration and resulting from the precipitation of indigo from an alkaline solution of indoxyl by aeration) are stirred with 2 parts of "Leukanol" until a thin fluid paste is obtained. 13 parts of cane sugar and 5 parts of the sodium salt of N-normal-butyl-amino-ethyl sulfuric acid (CH$_3$CH$_2$CH$_2$CH$_2$NHCH$_2$CH$_2$OSO$_3$Na) are then added, the mixture is stirred until solution of the alkyl sulfate is complete, and the resulting mixture is evaporated with stirring until a thick paste is formed. The thick paste is then placed in drying pans and evaporated to dryness at subatmospheric pressure. The dry product is ground and screened. There is thus obtained an indigo powder containing 80 per cent. of indigo which, when added to water, disperses readily. When employed for the preparation of an indigo vat with the aid of the usual reducing agents (for example, alkaline sodium hydrosulfite), the powder reduces very rapidly and produces a clear vat which dyes cotton even, blue shades of high tinctorial value. Instead of the butyl-aminoethyl sodium sulfate, other acid alkyl ester salts hereinbefore mentioned may be employed and particularly those amino alkyl sulfates which are represented by the formula

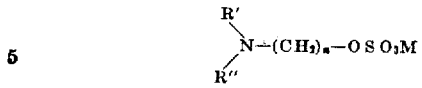

in which R' and R" represent hydrogen or the same or different hydrocarbon radicals which may contain substituents, or R' represents hydrogen and R" represents an alicyclic radical, and $n$ represents an integer between 2 and 5.

*Example 2.*—100 parts of the thioindigoid vat dye known as National Vat Orange R (Color Index 1217), in the form of an aqueous paste containing about 11 per cent of dye solids, are mixed with 2 parts of Leukanol and 87 parts of ethyl sodium sulfate ($C_2H_5OSO_3Na$) until solution of the latter is complete. The resulting suspension is evaporated to dryness, ground and screened. Instead of the ethyl sodium sulfate other salts of the lower alkyl sulfates may be employed. 100 parts of a Vat Orange R powder are thus obtained which, when employed in the preparation of a printing paste (for example by mixing 150 parts of the powder with 200 parts of British gum, 140 parts of potassium carbonate, 80 parts of sodium formaldehyde sulfoxylate, 50 parts of glycerin, and 380 parts of water) and utilized in the printing of cotton in accordance with the usual procedure, produces prints which in heavy shades are about 20 to 25 per cent. greater in strength than corresponding prints made without the alkyl sodium sulfate. In addition, the presence of the monoalkyl sulfuric acid salt results in a much greater brilliancy of shade and more complete penetration of the material, so that in many instances there are no back sides and the fastness to crocking is much enhanced.

It is to be noted that soluble salts of acid alkyl esters which contain an iso-radical (as for example the isopropyl radical, the isobutyl radical, etc.) are preferably employed in connection with vat dyes of the thioindigoid and indigoid series when the latter are to be employed for the preparation of printing pastes, in view of their superior action in the printing process.

*Example 3.*—To 200 parts of National Carbanthrene Violet 2R Standard Paste (Color Index 1104), containing 11 per cent. of dye solids in the form of an aqueous suspension, there are added 1 part of Leukanol, 5 parts of normal butyl sodium sulfate, and 72 parts of cane sugar or cerelose. The mixture is stirred until all the soluble material is dissolved, and is then evaporated to dryness, ground to a powder, and screened through a 60 mesh screen. The resulting product is a violet colored powder which is readily dispersed upon adding to water and is especially suitable for dyeing fibers by the pad and jig process. When the powder is made into a printing paste containing the usual additional ingredients, and the resulting paste is employed to print a textile fabric which is then dried, aged, developed and soaped in accordance with the standard procedure, a bright violet, fully penetrated, and level print is produced. Instead of normal butyl sodium sulfate, the potassium salt of the mono sulfuric acid ester of dimethyl ethyl carbinol may be used.

*Example 4.*—To 100 parts of the chlorinated indanthrone vat dye known as National Carbanthrene Blue BCS (Color Index No. 1114), in the form of an aqueous suspension or commercial paste containing 18 per cent of total dye solids, there are added with stirring 2 parts of Leukanal (or 3 parts of a 30 per cent solution of Leukanol), 50 parts of cane sugar, and 25 parts of dextrine. The suspension is stirred until homogeneous, and then 5 parts of the sodium salt of the acid sulfuric acid ester of N-cyclohexyl-N-diethanolamine are added and the mixture is stirred until solution of the alkyl sulfate is complete. The resulting mass, either as such or after evaporation, may be used as a paste; or it may be evaporated to dryness, ground and screened, as in Example 1, to produce a powder that is readily dispersed when added to water. The product, either in the form of paste or powder, gives uniform dyeings of high tinctorial value when employed to dye fabrics in accordance with standard practice, and especially by the pad and jig method.

*Example 5.*—To 100 parts of the vat dye known as National Vat Pink FF (6.6'-dichlor-4,4'-dimethyl thioindigo) in the form of an aqueous paste or suspension containing 15 per cent of dye solids, there are added 2 parts of Leukanol, 64 parts of disodium glycerin monophosphate and 18 parts of cane sugar. The mixture is stirred until the soluble material is all dissolved, and is then evaporated to dryness, ground and screened. A highly colored pink pigment is obtained which is readily dispersed in water or in printing pastes. If desired 1 part of ferrous sulfate ($FeSO_4.7H_2O$) and a sufficient amount of sodium hydroxide solution to render the mixture slightly alkaline to Brilliant Yellow paper (a few drops) may be added to the mixture before evaporation in order to enhance the printing action of the composition. Instead of the disodium glycerin monophosphate, the sodium salt of glycerin diphosphate or any of the other soluble acid alkyl ester salts hereinbefore mentioned, and particularly those which are derived from glycols or glycerin may be employed.

*Example 6.*—To 100 parts of National Carbanthrene Blue GCD Double Paste (Color Index 1113), containing 16.5 per cent of dye solids and 1 per cent of Leukanol, there are added 50 parts of the sodium salt of monoethyl ether of glycol sulfuric acid ($CH_3CH_2OCH_2CH_2OSO_3Na$) and 32.5 parts of urea, and the mixture is stirred until the latter are dissolved. The resulting suspension is evaporated to dryness, ground and screened. A very readily dispersible vat powder is obtained which is suitable for printing as well as dyeing. Instead of urea, cane sugar, dextrine, glue or other of the aforementioned diluents may be employed. Furthermore any of the hydrotropic substances hereinbefore mentioned may be included in the composition, and soluble salts of amino carboxylic acids, such as sarcosine (methyl glycine), etc. may also be added. The sodium salt of the monoethyl ether of glycol sulfuric acid may be replaced by any of the other soluble salts of the acid alkyl esters hereinbefore referred to, and especially the soluble salts of the isopropyl or isobutyl ethers of ethylene glycol sulfuric acid, the monomethyl or monoethyl ethers of diethylene glycol sulfuric acid, diethylene glycol mono- or disulfuric acid, etc.

In the above examples other acid alkyl ester salts, and particularly those derived from sulfuric or phosphoric acid, may be used alone or in admixture with others of said soluble salts instead of those specifically referred to. Furthermore, additional alkali metal salts of inorganic acids, as for example phosphoric, silicic, carbonic, sulfurous, hydrosulfurous acids, etc., as well as formaldehyde-sulfoxylates, may be employed in addition.

The vat dyes disclosed may be replaced by any other vat dye; as for example:

| Dye | Color Index |
|---|---|
| National Carbanthrene Yellow G | Color Index No. 1118 |
| National Carbanthrene Golden Orange G | Color Index No. 1096 |
| National Carbanthrene Golden Orange 2RT | Color Index No. 1097 |
| National Carbanthrene Blue Green FFB | Color Index No. 1173 |
| National Carbanthrene Violet 2R | Color Index No. 1104 |
| National Carbanthrene Dark Blue DR | Color Index No. 1099 |
| National Carbanthrene Red Violet 2RNX | Color Index No. 1161 |
| National Carbanthrene Brilliant Green | Supra-Color Index No. 1101 |
| National Vat Red Violet RH | (Cf. U. S. P. 916,029) |
| National Vat Scarlet G | Color Index No. 1228 |
| National Vat Brown G (Dinaphthyl thioindigo) | |
| National Vat Violet R | Color Index No. 1222 |
| National Brilliant Indigo B | Color Index No. 1190 |
| National Brilliant Indigo 4B | Color Index No. 1184 |
| National Brilliant Indigo 4G | Color Index No. 1189 |
| National Carbanthrene Red BN | Color Index No. 1162 |
| National Carbanthrene Brown AR | Color Index No. 1151 |
| National Carbanthrene Green B | Color Index No. 1102 |
| National Carbanthrene Olive R | Color Index No. 1150 |
| National Vat Yellow G | Color Index No. 1196 |
| National Carbanthrene Red AFF | Color Index No. 1133 |
| National Carbanthrene Blue RS | Color Index No. 1106 |
| National Vat Pink BG | Color Index No. 1210 |
| National Vat Yellow R | Color Index No. 1170 |
| National Carbanthrene Blue 3G | Color Index No. 1109 |

Furthermore, mixtures of two or more vat dyes may be employed when it is desired to obtain compound shades, such as scarlets, browns, navy blues, and blacks.

In the above examples the production of dry products by evaporating the pastes to dryness has been described. As hereinbefore noted, however, dry products may also be obtained in accordance with the present invention by admixing a suitable hydrate-forming soluble salt in an anhydrous condition with the paste, whereby a dry product is formed by formation of a hydrate of said salt. Thus, as will be further illustrated by specific examples hereinafter given, trisodium phosphate, sodium sulfate, sodium acetate or other suitable hydrate-forming soluble salts (having regard for the nature and intended use of the product) in an anhydrous condition (in the anhydrous form or a partially dehydrated form) may be admixed with the compositions of the present invention while they are in the form of a dispersion or paste, preferably in the form of a partially evaporated mixture. The resulting dry mixture may be ground and screened to form a powder. This latter procedure has the advantage of saving time and labor as compared with the evaporation procedure of drying. Furthermore, the danger of decomposition of the products by lengthy exposure to heat is considerably reduced. In most cases the resulting product is considerably denser (less bulky) and dusts less, and consequently is cheaper to ship on a volume basis and is more convenient to use.

*Example 7.*—To 100 parts of the pyranthrone vat dyestuff known as National Carbanthrene Golden Orange 2 RT Paste (Color Index 1097), containing 10 per cent. of dye solids in the form of an aqueous suspension and 1 per cent. of Leukanol, there are added 10 parts of cane sugar and 50 parts of isobutyl sodium sulfate. The mixture is evaporated with stirring until a paste containing 18 to 20 per cent. of water is obtained. 15 parts of anhydrous trisodium phosphate are then added and the mixture is stirred until a dry mass is produced. Upon grinding and screening the dry product, a very readily dispersible powder is obtained which produces deep and brilliant shades when employed for the printing of textile fibers in accordance with the standard procedure.

While the invention has been described particularly with relation to the preparation of vat dye powders which are especially suitable for the dyeing and printing of textile fabrics, it is to be understood that the invention is not limited thereto but that the readily dispersible vat dye powders of the present invention are also of especial utility in the preparation of aqueous suspensions of the dyestuff for use in the pigment form, as for the dyeing of paper, the tinting of fibers and other material, and the like.

It is to be further noted that the vat dye compositions of the present invention containing soluble acid alkyl ester salts may also be utilized as components of color discharge and resist printing preparations as well as of the dyeing and printing compositions above described.

*Powders of salts of leuco compounds of vat dyes*

*Example 8.*—20 parts of the dry sodium salt of the leuco compound of National Vat Orange R (Color Index 1217) are mixed with 2 parts of dry Leukanol, 50 parts of the sodium salt of glycerin phosphoric acid, 5 parts of the sodium salt of 1-naphthalene sulfonic acid and 23 parts of soluble dextrine. The resulting mixture forms a readily dispersible powder.

*Example 9.*—20 parts of the dry sodium salt of the leuco compound of National Vat Orange R, 2 parts of dry Leukanol and 50 parts of isobutyl sodium sulfate are dissolved in 200 parts of water while excluding air, preferably by maintaining an atmosphere of an inert gas (as for example, $CO_2$, nitrogen etc.) or of hydrogen. After solution is complete an aqueous solution resulting from the dissolution of 5 parts of the sodium salt of 1-naphthalene sulfonic acid in 50 parts of water, followed by dissolution of 23 parts of soluble dextrine in the resulting solution is added with agitation, and the resulting mass is evaporated to dryness either under atmospheric or subatmospheric pressure. After grinding and screening the dry residue a powder is obtained which disperses and dissolves very readily in water or in printing pastes. In forming a printing paste, preferably an alkali metal carbonate and only a very small amount of sodium formaldehyde sulfoxylate is employed. A fabric printed with such a printing paste, aged, developed and soaped in accordance with the standard procedure produces prints of very brilliant and fast orange shades.

*Example 10.*—300 parts of an indigo white paste (containing 20 per cent. of leuco indigo monoor disodium salt in the form of an aqueous suspension) are stirred with 2 parts of dry Leukanol until a thin fluid paste is obtained. 4 parts of normal-butyl-amino ethyl sodium sulfate $(CH_3CH_2CH_2CH_2NHCH_2CH_2OSO_3Na)$ are then added, the mixture is stirred until solution of the soluble matter is complete, and then evaporated with stirring until a thick paste containing about 18 parts of water is formed. 16 parts of anhydrous trisodium phosphate are then intimately mixed with the resulting paste until a dry product is obtained. There is thus produced 100 parts of a dry composition containing 60 per cent. of leuco indigo mono- or disodium salt. Upon grinding and screening through a screen of fine mesh, a fine dry powder is obtained which disperses very rapidly. It may be used for all dyeing processes, with or without the addition of reducing agents and alkali.

Example 11.—80 parts of a paste composed of 20 parts of the sodium salt of the leuco-compound of National Vat Orange R (Color Index 1217), in the enolic and/or ketonic form, 2 parts dry Leukanol, 5 parts of the sodium salt of naphthalene-1-sulfonic acid, 28 parts isobutyl sodium sulfate and 25 parts of water, are intimately mixed with 20 parts of anhydrous trisodium phosphate until a dry mass is obtained. Upon grinding the dry mass and screening, a readily dispersible powder of the sodium salt of the leuco compound of National Vat Orange R is obtained, which, when incorporated into a printing paste and employed for the printing of textile fabrics in accordance with the standard procedure, produces prints of very brilliant and fast orange shades showing excellent penetration.

Other leuco compounds of vat dyes in the form of their salts may be employed instead of those of Examples 8, 9, 10 and 11, and other assistants or catalysts may be added, depending upon the nature of the leuco compound of the vat dye employed. If the leuco compound of the vat dye is a member of the indigoid or thioindigoid series, a hydrotropic and/or enolyzing substance is preferably included in the composition.

Powders of ester salts of leuco compounds of vat dyes

Example 12.—A mixture of 25 parts of the sodium salt of the sulfuric acid ester of the leuco compound of dimethoxy dibenzanthrone, 25 parts of soluble dextrine and 50 parts of the 4-methyl-2-nitro-phenyl ether of glycol sodium monosulfate (obtainable, for example, in accordance with U. S. Patent 1,644,524) is dissolved in 500 parts of water and the mixture is evaporated to dryness. A very readily dispersible and soluble powder is obtained which, when used for dyeing, oxidizes very readily upon after-treatment.

Example 13.—20 parts of the sodium salt of the sulfuric acid ester of the leuco compound of dimethoxy dibenzanthrone are dissolved in 250 parts of water. 50 parts of the 4-methyl-2-nitrophenyl ether of glycol sodium monosulfate (employed in Example 12) are then added and the solution is evaporated with stirring until its water content is about 17 to 18 per cent. 15 parts of anhydrous sodium sulfate are admixed with the resulting paste until a dry product is obtained. A dry powder is thus produced which disintegrates and dissolves readily in water or in printing pastes.

Instead of the soluble salt of the sulfuric acid ester of the leuco compound employed in the above examples, the corresponding salts of the sulfuric acid esters of leuco compounds of other vat dyes may be employed or the corresponding soluble salts of the phosphoric acid esters of leuco compounds of vat dyes may be used.

Indulin and nigrosine dye and base powders

Example 14.—60 parts of indulin base (or the sulfonation product thereof) and 40 parts of isopropyl sodium sulfate are dissolved in 500 parts of alcohol or other suitable solvent, and the mixture is evaporated to dryness. A dark powder is thus obtained which disperses very readily in water and which, when incorporated into a printing paste and printed on silk or woolen fabrics, produces very uniform shades of navy blue and black.

Alizarin powder

Example 15.—400 parts of alizarin, in the form of an aqueous paste containing 20 per cent of 1.2-dihydroxy-anthraquinone, are mixed with 4 parts of Leukanol, 10 parts of calcium amylene sulfate and 6 parts of sucrose until all soluble material is in solution. The resulting mixture is evaporated to dryness, ground and screened. There is thus obtained a readily dispersible alizarine powder of particular value for dyeing or printing textile fibers. Instead of evaporating to substantial dryness, the mixture may be employed in the form of a paste.

Vigoureux printing dye powders

Example 16.—20 parts of Eriochrome Black A (Color Index No. 204), and 25 parts of isobutyl sodium sulfate are dissolved in alcohol and the resulting solution is poured into an aqueous solution containing 55 parts of soluble dextrine. The mixture is evaporated to dryness, ground and screened. A readily dispersible powder is obtained which may be used for dyeing woolen fabrics, particularly by the Vigoureux printing process.

Example 17.—55 parts of the zinc salt of Eriochrome Black A (Color Index No. 204), 30 parts of trisodium phosphate and 15 parts of the isopropyl ether of ethylene glycol sodium sulfate are intimately mixed by grinding in the dry state, or by grinding in the presence of alcohol or another suitable solvent followed by evaporation to dryness. There is thus obtained a powder particularly suitable for dyeing wool by the Vigoureux printing process.

Example 18.—73 parts of the press cake of the zinc salt of Eriochrome Black A (Color Index No. 204), as obtained in the course of manufacture and containing about 75 per cent of the salt and about 25 per cent of water and the usual impurities, are intimately mixed with 12 parts of tertiary butyl sodium sulfate. 15 parts of anhydrous trisodium phosphate are then admixed with the resulting mass until a dry product is obtained, and the dry product is ground to a fine powder. The resulting powder is of greater density than the powders of Examples 16 and 17 and possesses similar suitability for dyeing wool by the Vigoureux printing process.

Instead of the dye disclosed in Examples 16, 17 and 18, any other dye may be substituted which is an acid or mordant dye and/or is useful for dyeing by the Vigoureux printing process. Furthermore, other acid alkyl ester salts hereinbefore referred to may be employed instead of, or in conjunction with, the alkyl sulfates employed in said examples.

Powders of azo pigments and dyes for lakes

*Example 19.*—100 parts of Helio Fast Pink RL, containing 25.3 per cent of dye solids in the form of an aqueous suspension, 2 parts of Leukanol, 30 parts of normal amyl sodium sulfate, 20 parts of soluble dextrine and 23 parts of cane sugar are mixed until all soluble material is dissolved, and the mixture is evaporated to dryness, dried and screened. The resulting product may be used for tinting textiles, paper and the like in the form of an aqueous dispersion, and possesses high coloring power in view of the excellent dispersibility of the powder. The powder is also of excellent utility in the making of lakes. In a similar manner other azo dye pigments and other dyes suitable for making lakes may be obtained in the form of a readily dispersible powder, as for example, Hansa Green G (New Schultz No. 640), Helio Fast Red RL (Color Index No. 69), etc. The normal amyl sodium sulfate may be replaced by others of the acid alkyl ester salts herein disclosed.

Dye powders for use in making lakes may also be obtained in a manner similar to that hereinbefore given by bringing the aqueous paste containing the dye and acid alkyl ester salt to dryness with the aid of a hydrate-forming soluble salt in an anhydrous condition, as for example anhydrous or partially dehydrated aluminum sulfate.

In this connection it is to be noted that the particular hydrate-forming soluble salt employed should be chosen with a view to the subsequent use of the product. Thus, if the product is to be used in an alkaline medium, as for example in the case of vat dyes, the hydrate-forming salt should preferably be one which produces an alkaline reaction in aqueous solution, as for example trisodium phosphate, sodium sulfate, sodium acetate and the like. On the other hand, when the product is to be used in an acidic medium, as for example in the formation of certain lakes, the hydrate-forming salt should preferably be selected from the class of alkali earth metal and heavy metal salts of strong acids.

Hydroxynaphthoic acid arylide powders

*Example 20.*—300 parts of the sodium salt of Naphthol AS-D (the o-toluidid of 2.3-hydroxynaphthoic acid) are dissolved in 3,000 parts of water with the aid of heat. 50 parts of isobutyl sodium sulfate are added and the mixture is stirred until solution is complete; it is then evaporated to dryness, ground and screened. A very readily dispersible yellow powder is thus obtained which is particularly adaptable for use in producing developed dyeings as well as prints. Other arylides of 2.3 hydroxynaphthoic acid as well as other suitable coupling components or developers may similarly be produced in advantageous powder form in accordance with the present invention, as for example naphthols, naphtholates, methyl-phenyl-pyrazolones, various arylides of aceto-acetic acid, various arylides of 2-hydroxy-carbazol-o-carboxylic acid, 2.4-dihydroxyquinolines, and the like. Moreover, any of the other acid alkyl ester salts herein disclosed may be employed.

Powders of mixtures of hydroxynaphthoic acid arylides and stabilized forms of diazo compounds

*Example 21.*—434 parts of the diazo amino compound obtainable by combining the diazonium chloride of 2.5-dichlor aniline with the sodium salt of 4-sulfo-2-amino-benzoic acid are intimately mixed with 350 parts of the powder obtained in accordance with Example 20, and 216 parts of soluble dextrine. The resulting product may be directly incorporated into a printing composition and produces prints of excellent brightness and evenness.

*Example 22.*—200 parts of the diazo imino compound obtained by combining the diazonium salt of meta-chlortoluidine with dimethyl amine are dissolved in 2,000 parts of ethyl alcohol. After solution is complete, 300 parts of the sodium salt of Naphthol AS-D and 500 parts of isobutyl sodium sulfate are added; the mixture is evaporated to dryness, ground and screened. A readily dispersible yellow powder is thus obtained which yields a good printing paste composition. When incorporated into a printing paste of the type usually employed in connection with such mixtures, printed on a textile fabric and subjected to an acid after-treatment, very bright red prints of excellent quality are obtained.

Mixtures of other suitable stabilized forms of diazo compounds and other suitable coupling components or developers (as for example, those of the type hereinbefore referred to) may be prepared in a manner similar to that described in Examples 21 and 22, and others of the acid alkyl ester salts herein disclosed may be employed.

*Example 23.*—450 parts of a filter cake of the sodium salt of meta-chlortoluene-diazo methyl aminoacetic acid, obtained by salting out the reaction product of the diazonium compound of meta-chlortoluidine with sarcosine (methyl glycine), and containing approximately 31.4 per cent of the equivalent of meta-chlortoluidine and about 38 per cent of water and the usual impurities, are intimately mixed with 300 parts of the sodium salt of Naphthol AS-D and 100 parts of isobutyl sodium sulfate. The resulting paste is brought to dryness by intimate admixture with 150 parts of anhydrous trisodium phosphate. Upon grinding the dry mass and screening through a screen of fine mesh, a readily dispersible powder is obtained which can be added directly to starch-tragacanth printing pastes without being previously dissolved in water or other solvents. The resulting printing pastes, when printed on a textile fabric and subjected to an acid after-treatment in accordance with the usual procedure, produce prints of excellent quality.

Powders of discharge and printing catalysts

*Example 24.*—100 parts of an anthraquinone paste containing 30 per cent of anthraquinone in water suspension, 3 parts of Leukanol, 20 parts of cane sugar and 47 parts of isoamyl sodium sulfate are mixed until solution of all soluble material is complete. The resulting mixture is evaporated to dryness, ground and screened. A very rapidly dispersible powder is thus obtained which, when added to water, produces an extremely finely divided suspension of anthraquinone. This powder may be added directly to a discharge paste, as for example, a sodium hydrosulfite discharge paste, or it may be incorporated into vat color printing pastes of all types. Instead of anthraquinone any of its derivatives may be used, as for example amino anthraquinones, hydroxyanthraquinones, mercaptoanthraquinones, and/or their more soluble derivatives (such as sulfonic acids, carboxylic acids, etc.). Other substances having catalytic or booster action in connection with vat dye printing compositions may also be similarly prepared in powder form, as for example, acenaphthequinone, retenequinone, etc. Furthermore, any of the other acid alkyl ester salts herein disclosed may be employed instead of the isoamyl sodium sulfate.

Certain features of the present invention and of the disclosure of the present application are more fully described and specifically claimed in my co-pending application for Vat dye composition, Serial No. 673,030 filed of even date herewith.

I claim:

1. A vat dye composition in the solid form for use in coloring, dyeing, and textile printing which comprises a mixture of a vat dye and a soluble salt of an acid alkyl ester of an inorganic polybasic acid, said acid alkyl ester consisting, on the one hand, of a radical of an inorganic polybasic acid in which at least one of the replaceable hydrogen atoms is present, and on the other hand, of one or more organic radicals directly linked to the inorganic radical, said organic radicals being free from open-chain hydrocarbon radicals containing more than 5 carbon atoms.

2. A vat dye composition in the dry solid form comprising an intimate mixture of a vat dye and an alkali metal salt of an acid alkyl ester of an inorganic polybasic acid, said acid alkyl ester consisting, on the one hand, of a radical of an inorganic polybasic acid in which at least one of the replaceable hydrogen atoms is present, and on the other hand, of one or more organic radicals directly linked to the inorganic radical, said organic radicals being free from open-chain hydrocarbon radicals containing more than 5 carbon atoms and obtainable by drying an aqueous mixture thereof.

3. A vat dye composition in the dry solid form for use in coloring, dyeing, and textile printing comprising an intimate mixture of a vat dye, a dispersing agent and an alkali metal salt of an acid alkyl ester of an inorganic polybasic acid, said acid alkyl ester consisting, on the one hand, of a radical of an inorganic polybasic acid in which at least one of the replaceable hydrogen atoms is present, and on the other hand, of one or more organic radicals directly linked to the inorganic radical, said organic radicals being free from open-chain hydrocarbon radicals containing more than 5 carbon atoms.

4. A vat dye composition in the dry solid form for use in coloring, dyeing, and textile printing comprising an intimate mixture of a vat dye and a readily soluble salt of an acid alkyl ester of sulfuric acid, in which the organic radical is free from open-chain hydrocarbon radicals containing more than 5 carbon atoms.

5. A vat dye composition in the dry solid form for use in textile printing comprising an intimate mixture of a vat dye, an aldehyde condensation product of an aromatic sulfonic acid, and an alkali metal salt of an acid alkyl ester of sulfuric acid, in which the organic radical is free from open-chain hydrocarbon radicals containing more than 5 carbon atoms, and obtainable by drying from an aqueous mixture thereof.

6. A vat dye composition in the solid form for use in coloring, dyeing and textile printing which comprises an intimate mixture of a vat dye and a soluble salt of an acid alkyl ester containing less than 6 carbon atoms in the alkyl group and derivable from a polybasic inorganic acid and a polyhydric alcohol containing not more than 5 carbon atoms.

7. A vat dye composition in the dry, solid form for use in coloring, dyeing and textile printing which comprises an intimate mixture of a vat dye and a readily soluble salt of an acid alkyl ester of sulfuric acid in which the organic radical is derivable from a polyhydric alcohol containing not more than 5 carbon atoms.

8. A vat dye composition in the dry, solid form for use in coloring, dyeing and textile printing which comprises an intimate mixture of a vat dye and an alkali metal salt of an acid alkyl ester of sulfuric acid in which the organic radical is derivable from a glycol containing not more than 5 carbon atoms.

9. A vat dye composition in the dry, solid form for use in coloring, dyeing and textile printing which comprises an intimate mixture of a vat dye in the unreduced form and an alkali metal salt of a glycol disulfate containing not more than 5 carbon atoms.

10. A vat dye composition in the solid form for use in coloring, dyeing, and textile printing which comprises an intimate mixture of a vat dye and a soluble salt of an acid alkyl ester of an inorganic polybasic acid, said acid alkyl ester consisting, on the one hand, of a radical of an inorganic polybasic acid in which at least one of the replaceable hydrogen atoms is present, and on the other hand, of one or more organic radicals directly linked to the inorganic radical, said organic radicals being free from open-chain hydrocarbon radicals containing more than 5 carbon atoms and at least one of said organic radicals being an alicyclic radical.

11. A vat dye composition in the solid form for use in coloring, dyeing and textile printing which comprises an intimate mixture of a vat dye and a readily soluble salt of an acid alkyl ester of a polybasic inorganic acid in which the organic radical is an alicyclic radical.

12. A vat dye composition in the dry, solid form for use in coloring, dyeing and textile printing which comprises an intimate mixture of a vat dye and an alkali metal salt of an acid alkyl ester of sulfuric acid in which the organic radical is an alicyclic radical.

13. A vat dye composition in the dry solid form for use in coloring, dyeing, and textile printing comprising an intimate mixture of a vat dye, an aldehyde condensation product of an aromatic sulfonic acid, and an alkali metal salt of an acid alkyl ester of sulfuric acid, in which the organic radical is an alicyclic hydrocarbon radical.

14. A vat dye composition in the solid form for use in coloring, dyeing, and textile printing which comprises an intimate mixture of a vat dye and an alkali metal salt of an acid alkyl ester containing less than 6 carbon atoms in the alkyl group and derivable from a polyhydric alcohol containing not more than 5 carbon atoms and a polybasic inorganic acid selected from the group consisting of sulfuric and phosphoric acids.

15. A vat dye composition in the solid form for use in coloring, dyeing, and textile printing, which comprises an intimate mixture of a vat dye and an alkali metal salt of an acid alkyl ester of a polybasic inorganic acid selected from the group consisting of sulfuric and phosphoric acids in which the organic radical is an alicyclic hydrocarbon radical.

16. A vat dye composition in the dry solid form for use in coloring, dyeing, and textile printing which comprises an intimate mixture of a vat dye and an alkali metal salt of cyclohexyl sulfuric acid.

17. A vat dye composition in the solid form for use in coloring, dyeing, and textile printing which comprises a mixture of a vat dye and a soluble salt of an acid alkyl ester of an inorganic polybasic acid, said acid alkyl ester consisting, on the one hand, of a radical of an inorganic polybasic acid in which at least one of the replaceable hydrogen atoms is present, and on the other hand, of one or more organic radicals directly linked to the inorganic radical, said organic radicals being free from open-chain hydrocarbon radicals containing more than 5 carbon atoms and at least one of said organic radicals being an aminoalkyl radical.

18. A vat dye composition in the dry solid form for use in coloring, dyeing, and textile printing which comprises an intimate mixture of a vat dye and an alkali metal salt of the acid sulfuric acid ester of N-cyclohexyl-N-diethanolamine.

JEAN G. KERN.

CERTIFICATE OF CORRECTION.

Patent No. 2,145,193. January 24, 1939.

JEAN G. KERN.

It is hereby certified that error appears in the printed specification of the above numbered patent requiring correction as follows: Page 1, second column, line 9, for the word "process" read processes; page 2, first column, line 65, for "absorber" read absorbed; page 5, first column, line 23, for "bethylene-di" read methylene-di; line 26, for "abietine" read abietene; same page, second column, line 63, for "Zeithschrift" read Zeitschrift; line 72, for "potasium" read potassium; page 6, first column, line 44, for "anthra-quinone" read anthraquinone; page 7, first column, line 34, for "reprsented" read represented; page 10, first column, line 18, for "rapidly" read readily; page 12, first column, line 66, claim 5, strike out the word "from"; and that the said Letters Patent should be read with this correction therein that the same may conform to the record of the case in the Patent Office.

Signed and sealed this 21st day of March, A. D. 1939.

Henry Van Arsdale.

(Seal) Acting Commissioner of Patents.

for use in coloring, dyeing, and textile printing which comprises a mixture of a vat dye and a soluble salt of an acid alkyl ester of an inorganic polybasic acid, said acid alkyl ester consisting, on the one hand, of a radical of an inorganic polybasic acid in which at least one of the replaceable hydrogen atoms is present, and on the other hand, of one or more organic radicals directly linked to the inorganic radical, said organic radicals being free from open-chain hydrocarbon radicals containing more than 5 carbon atoms and at least one of said organic radicals being an aminoalkyl radical.

18. A vat dye composition in the dry solid form for use in coloring, dyeing, and textile printing which comprises an intimate mixture of a vat dye and an alkali metal salt of the acid sulfuric acid ester of N-cyclohexyl-N-diethanolamine.

JEAN G. KERN.

CERTIFICATE OF CORRECTION.

Patent No. 2,145,193.                             January 24, 1939.

JEAN G. KERN.

It is hereby certified that error appears in the printed specification of the above numbered patent requiring correction as follows: Page 1, second column, line 9, for the word "process" read processes; page 2, first column, line 65, for "absorber" read absorbed; page 5, first column, line 23, for "bethylene-di" read methylene-di; line 26, for "abietine" read abietene; same page, second column, line 63, for "Zeithschrift" read Zeitschrift; line 72, for "potasium" read potassium; page 6, first column, line 44, for "anthra-quinone" read anthraquinone; page 7, first column, line 34, for "reprsented" read represented; page 10, first column, line 18, for "rapidly" read readily; page 12, first column, line 66, claim 5, strike out the word "from"; and that the said Letters Patent should be read with this correction therein that the same may conform to the record of the case in the Patent Office.

Signed and sealed this 21st day of March, A. D. 1939.

Henry Van Arsdale.

(Seal)                                   Acting Commissioner of Patents.